United States Patent
Bui et al.

(10) Patent No.: US 8,016,221 B2
(45) Date of Patent: Sep. 13, 2011

(54) APPARATUS, SYSTEM, AND METHOD FOR DYNAMIC TAPE STICK AND TAPE BREAK DETECTION

(75) Inventors: Nhan Xuan Bui, Tucson, AZ (US); Reed Alan Hancock, Tucson, AZ (US); Eiji Ogura, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/022,330

(22) Filed: Jan. 30, 2008

(65) Prior Publication Data
US 2009/0190244 A1  Jul. 30, 2009

(51) Int. Cl.
*G11B 15/00* (2006.01)
(52) U.S. Cl. ............... 242/333.7; 242/333.1; 242/333.6
(58) Field of Classification Search ............... 242/33, 242/333.1, 333.2, 333.5, 333.6, 333.7, 334, 242/334.1, 334.2, 334.3, 334.4, 334.5, 334.6; 360/73.4, 74.2
See application file for complete search history.

(56) References Cited

U.S. PATENT DOCUMENTS

| | | | | |
|---|---|---|---|---|
| 4,341,364 A | * | 7/1982 | Maddaloni | 242/333.7 |
| 5,019,924 A | * | 5/1991 | Takai et al. | 360/74.2 |
| 5,600,504 A | * | 2/1997 | Seo | 360/74.2 |
| 6,052,264 A | * | 4/2000 | Curtis | 242/341 |
| 2003/0029950 A1 | * | 2/2003 | Panda et al. | 242/334.3 |

FOREIGN PATENT DOCUMENTS

| | | |
|---|---|---|
| JP | 64-070949 | 3/1989 |
| JP | 02-244447 | 9/1990 |
| JP | 02-265064 | 10/1990 |
| JP | 05-234178 | 9/1993 |

\* cited by examiner

*Primary Examiner* — William A Rivera
(74) *Attorney, Agent, or Firm* — Kunzler Needham Massey & Thorpe

(57) ABSTRACT

An apparatus, system, and method are disclosed for dynamic tape stick and tape break detection. A first counter increments a first count and resets a second count in response to a sensor pulse from a first sensor of a first tape servo. A second counter increments the second count and resets the first count in response to a sensor pulse from a second sensor of a second tape servo. A detection module detects either the first count or the second count exceeding an error threshold.

20 Claims, 6 Drawing Sheets

APPARATUS, SYSTEM, AND METHOD FOR DYNAMIC TAPE STICK AND TAPE BREAK DETECTION

BACKGROUND OF THE INVENTION

1. Field of the Invention

This invention relates to tape sticking and more particularly relates to dynamically detecting tape sticking and tape breakage.

2. Description of the Related Art

Data storage systems frequently use magnetic tape as a cost effective storage media. Magnetic tape is hereafter referred to as tape. The tape is typically stored on a first reel within a cartridge. The cartridge may be inserted into a tape drive so that data may be read from the tape or the data may be written to the tape.

An end of the tape is spooled around a second reel within the tape drive. Servos motivate the first and second reels to move the tape over a head. The head includes read elements that read data from the tape and write elements that write data to the tape. The data is encoded as magnetically polarized areas on the tape.

The tape is typically written with very high data densities. As a result, the tape must be positioned very near the head in order for the read elements to read the data and the write elements to write the data. However, the tape drive frequently stops and/or reverses the movement of the tape. When the tape is stopped, the tape may stick to the head.

A stuck tape is a serious problem. The pulling servo may continue to exert a force on the tape. If the tape becomes unstuck, the pulling servo may accelerate and damage the tape. Alternatively, the feeding servo may continue to feed tape in the tape path, damaging the tape.

SUMMARY OF THE INVENTION

From the foregoing discussion, there is a need for an apparatus, system, and method that dynamically detects tape stick and tape break. Beneficially, such an apparatus, system, and method would support mitigation of tape and head damage by detecting tape sticking and breakage.

The present invention has been developed in response to the present state of the art, and in particular, in response to the problems and needs in the art that have not yet been fully solved by currently available tape systems. Accordingly, the present invention has been developed to provide an apparatus, system, and method for dynamically detecting tape sticking and tape breakage that overcome many or all of the above-discussed shortcomings in the art.

The apparatus to detect tape sticking is provided with a plurality of modules configured to functionally execute the steps of incrementing a first count and resetting a second count, incrementing the second count and resetting the first count, and detecting either the first count or the second count. These modules in the described embodiments include a first counter, a second counter, and a detection module.

The first counter increments the first count and resets the second count in response to a sensor pulse from a first sensor of a first tape servo. The second counter increments the second count and resets the first count in response to a sensor pulse from a second sensor of a second tape servo. The detection module detects either the first count or the second count exceeding an error threshold.

A system of the present invention is also presented to detect tape sticking. The system may be embodied in a tape drive. In particular, the system, in one embodiment, includes a first reel, a second reel, a first tape servo, a second tape servo, a first Hall effect sensor, a second Hall effect sensor, a first counter, a second counter, and a detection module.

The first reel spools tape. The first tape servo motivates the first reel. The first Hall effect sensor measures angular displacement of the first reel. The second reel also spools the tape. The second tape servo motivates the second reel. The second Hall effect sensor measures angular displacement of the second reel.

The first counter increments a first count and resets a second count in response to a sensor pulse from the first Hall effect sensor. The second counter increments the second count and resets the first count in response to a sensor pulse from the second Hall effect sensor. The detection module detects either the first count or the second count exceeding an error threshold.

A method of the present invention is also presented for detecting stuck tape. The method in the disclosed embodiments substantially includes the steps to carry out the functions presented above with respect to the operation of the described apparatus and system. In one embodiment, the method includes incrementing a first count and resetting a second count, incrementing the second count and resetting the first count, and detecting either the first count or the second count.

A first counter increments the first count and resets the second count in response to a sensor pulse from a first sensor of a first tape servo. A second counter increments the second count and resets the first count in response to a sensor pulse from a second sensor of a second tape servo. A detection module detects either the first count or the second count exceeding an error threshold.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention detects tape sticking and breakage using counters. In addition, the present invention may protect against tape and head damage through rapid detection of tape sticking and breakage. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
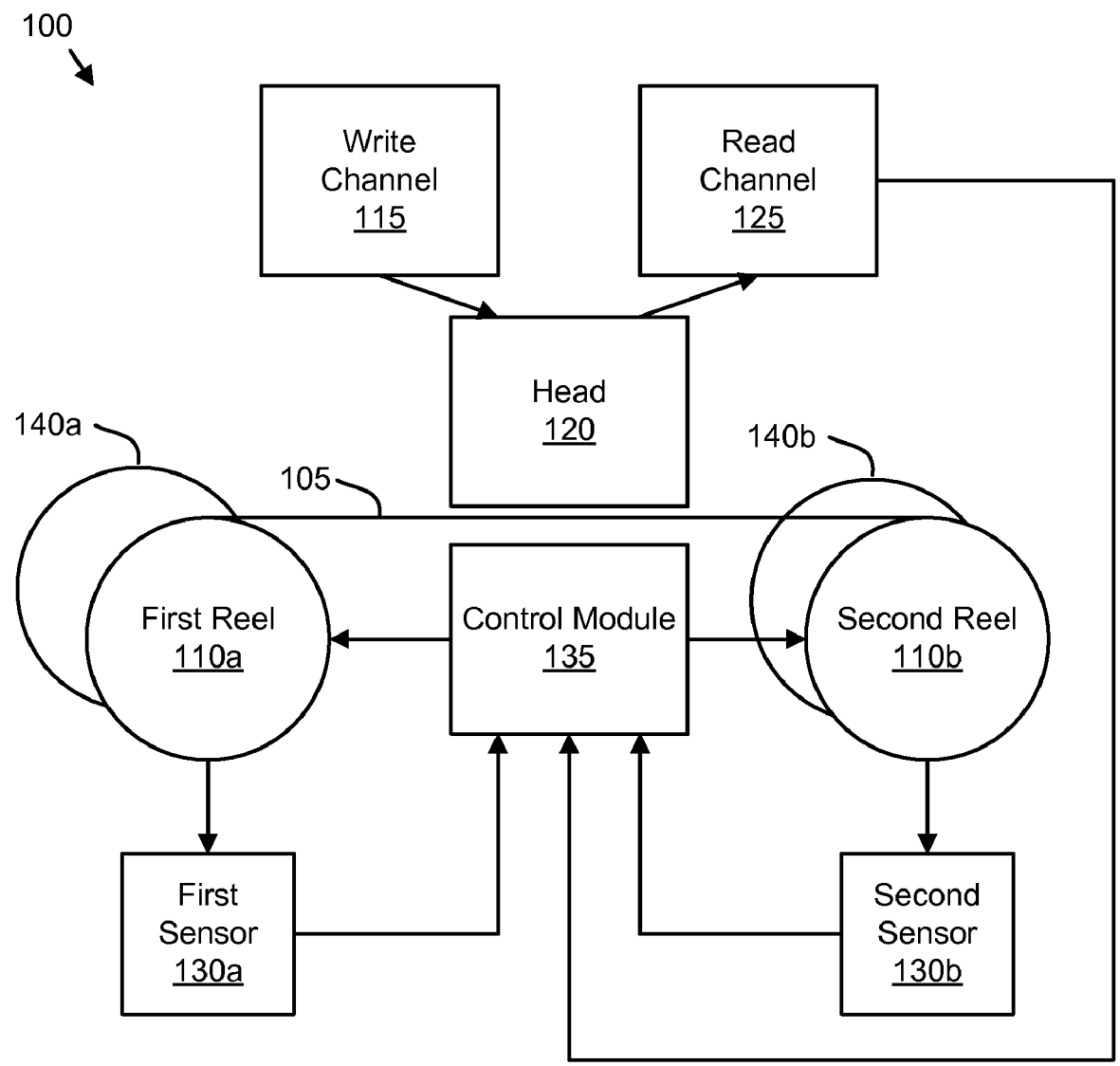
FIG. 1 is a schematic block diagram illustrating a side view of one embodiment of a tape drive in accordance with the present invention.

FIG. 1 is a schematic block diagram illustrating one embodiment of a tape drive 100 in accordance with the present invention. The tape drive 100 includes a tape 105, a first reel 110a, a second reel 110b, a first tape servo 140a, a second tape servo 140b, a write channel 115, a head 120, a read channel 125, a first sensor 130a, a second sensor 130b, and a control module 135. Although, for simplicity, the tape drive 100 is shown with one tape 105, one first tape servo 140a, one second tape servo 140b, one write channel 115, one head 120, one read channel 125, one first sensor 130a, one second sensor 130b, and one control module 135, any number of those may be employed in the tape drive 100.

The tape 105 may comprise a thin plastic film with a coating of magnetic particles for example, of ferrous-oxide as is well known to those skilled in the art. The head 120 may communicate with the write channel 115 and the read channel 125 to write data to the tape 105 or read the data from the tape 105 respectively. The tape 105 may store magnetically encoded data as is well known to those skilled in the art.

The head 120 may write the magnetically encoded data to the tape 105. The write channel 115 may comprise solid-state electronics for converting digital data to a write signal that drives a write element in the head 120 to write the magnetically encoded data. For example, the head 120 may receive incoming analog electrical signals that may produce a time-varying magnetic field on the tape 105. As the tape 105 moves past the head 120, particles of magnetic powder on the tape 105 may be magnetized due to the time-varying magnetic field in one of two (2) directions.

The head 120 may also convert the magnetically encoded data on the tape 105 into a read signal. The read channel 125 may convert the read signal into digital data as is well known to those skilled in the art. The head 120 and the read channel 125 may be constructed using solid-state electronics and ferro-electric materials as is well known to those skilled in the art.

The first reel 110a is configured to spool the tape 105. The first tape servo 140a is configured to motivate the first reel 110a. The second reel 110b is also configured to spool the tape 105. The second tape servo 140b is configured to motivate the second reel 110b. The first servo 140a and the second servo 140b may apply torques in a tape motion direction to spool the tape 105. One or more torques in the tape motion direction may generally be referred as positive torques and one or more torques opposite to the tape motion direction may generally be referred as negative torques.

Either the first reel 110a or the second reel 110b may act as the leading reel. The tape 105 may move in the tape motion direction with the first reel 110a generally referred as a trailing reel to the second reel 110b generally referred as a leading reel or vive-versa. For example, the second tape servo 140b may be configured to motivate the second reel 110b by applying the positive torque of two point five Newton meters (2.5 Nm) to the second reel 110b that in turn, may spool a proximal end of the tape 105.

Also the first tape servo 140a may be configured to motivate the first reel 110a by applying another positive torque of two point four Newton meters (2.4 Nm) to the first reel 110a that in turn, may spool a distal end of the tape 105. The plurality of tape servos 140a-b, may be brushless electric motors as are well known to those skilled in the art.

The first sensor 130a and the second sensor 130b may be configured as Hall effect sensors. The first Hall effect sensor 130a measures angular displacement of the first reel 110a. The second Hall effect sensor 130b measures angular displacement of the second reel 110b. The first and second Hall effect sensors 130a-b may be analog transducers as is well known to those skilled in the art.

The Hall effect sensors 130a-b may use one or more rotating targets for measuring angular displacement of the first reel 110a and the second reel 110b respectively. Each rotating target may contain a magnet attached to the brushless electric motor of each tape servo 140a-b as is well known to those skilled in the art.

Each rotating target may also be configured as a toothed wheel. The rotating targets may vary a magnetic flux density of a magnet inside sensor heads of the first sensor 130a and the second sensor 130b. A probe may be mounted with its head at a precise distance from the target wheel and may detect the teeth or magnets passing the probes face.

Alternatively, the sensors 130a-b may be optical positioning sensors. The optical positioning sensors may use a single light beam and/or double light beams to read optical codes and measure angular displacement of the first reel 110a and the second reel 110b.

The sensors 130a-b configured as optical positioning sensors may detect code patterns of the first reel 110a and the second reel 110b respectively to incident laser beams. The sensors 130a-b may convert the regular interruptions caused by the optical codes into waveforms, pulses, signals, or the like. The waveforms, pulses, signals may be referred as sensor pulses.

For example, the first sensor 130a may measure angular displacement of one radian (1 rad) of the first reel 110a. In another example, the second sensor 130b may measure angular displacement of two radians (2 rads) for the second reel 110b. The first sensor 130a and the second sensor 130b may be embodied in the first tape servo 140a and the second tape servo 140b respectively of the tape drive 100.

The control module 135 may include a processor that may execute software instructions as is well known to those skilled in the art. Further, the control module 135 may include a tangible storage device selected from an Integrated Circuit (IC), a hard disk, or the like.

The control module 135 may direct the first tape servo 140a and the second servo 140b to apply torques to the first reel 110a and the second reel 110b respectively to spool the tape 105. For example, the control module 135 may direct the first tape servo 140a and the second tape servo 140b to apply leading torques of two point four Newton meters (2.4 Nm) to the first reel 110a and two point five Newton meters (2.5 Nm) to the second reel 110b respectively to spool the tape 105 in the tape motion direction from the first reel 110a to second reel 110b.

The control module 135 may communicate with the first tape servo 140a, second tape servo 140b, write channel 115, read channel 125 to spool the tape 105, read and/or write the data. The first sensor 130a and the second sensor 130b may also communicate with the control module 135 to communicate measured angular displacements of the first reel 110a and the second reel 110b respectively. All the communications may be through cables, printed circuit board, and the like and/or wireless as is well known to those skilled in the art.

Figure 2:
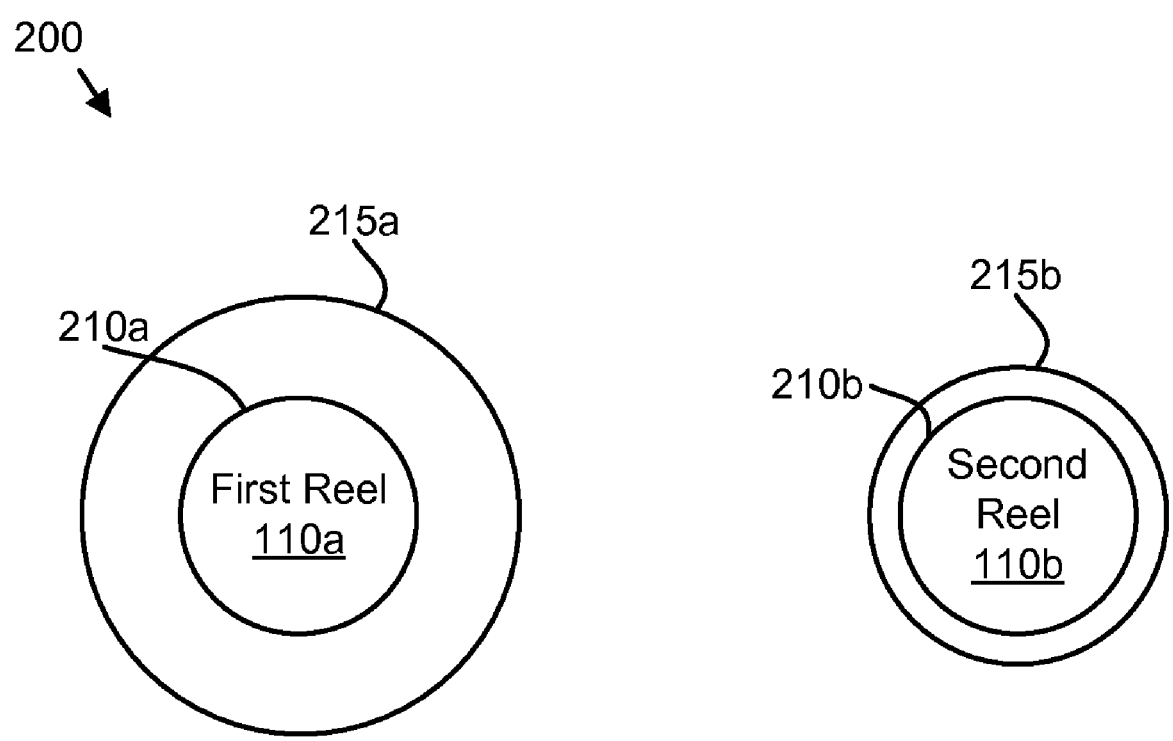
FIG. 2 is a side view of one embodiment of tape reels of the present invention.

FIG. 2 is a side view of one embodiment of tape reels 200 of the present invention. The tape reels 200 may be embodied in the tape drive 100 of FIG. 1. The description of the tape reels 200 refers to elements of FIG. 1, like numbers referring to like elements. The tape reels 200 include a first reel 110a and a second reel 110b. The first reel 110a and the second reel 110b may be the first reel 110a and the second reel 110b of the tape drive 100 of FIG. 1.

The reels 110a-b may be of a suitable material such as a plastic, a metal, or the like. The first reel 110a may be disposed in a cartridge to protect the tape 105 and additionally to facilitate handling of the tape 105. The second reel 110b may be disposed within the tape drive 100. The tape 105 may be configured with digital data storage (DDS), linear tape-open (LTO), digital linear tape (DLT) formats, or the like.

The first reel 110a and the second reel 110b may be substantially circular in shape and substantially of same diameter. The tape 105 may spool from a first cylinder 210a of the first reel 110a and wind on a second cylinder 210b of the second reel 110b. For example, the tape 105 may wind on the second cylinder 210b of the second reel 110b by uniformly forming a layer of the tape 105 on the second cylinder 210b and then further forming another layer over a previous layer and so on.

The first cylinder 210a and the second cylinder 210b may define inner radiuses of the first reel 110a and the second reel 110b. For example, the first cylinder 210a and the second cylinder 210b may define the inner radiuses of the first reel 110a and the second reel 110b of two point five (2.5) centimeters each.

The first reel 110a is shown with a portion of the spooled tape 105 forming an outer surface 215a of the first reel 110a. The second reel 110b is also shown with remaining portion of the spooled tape 105 forming an outer surface 215b of the second reel 110b.

The first outer surface 215a and the second outer surface 215b may define an outer radius of the first reel 110a and the second reel 110b at a particular moment during movement of the tape 105. For example, the outer surface 215a of the first reel 110a may define the outer radius of five (5) centimeters of the first reel 110a and the outer surface 215b of the second reel 110b may define the outer radius of two point seven five (2.75) centimeters of the second reel 110b at the same moment during movement of the tape 105.

In one embodiment, the ratio of the radius of the outer surface 215a to the radius of the outer surface 215b is a radius ratio. Alternatively, the ratio of the inner radius of the first cylinder 210a to the inner radius of the second cylinder 210b may be the radius ratio. In one embodiment, the radius ratio is normalized to a ratio of a value to one. The normalized ratio may also have the value in the range of two (2) to five (5), and is referred to hereafter as a maximum radius ratio.

Figure 3:
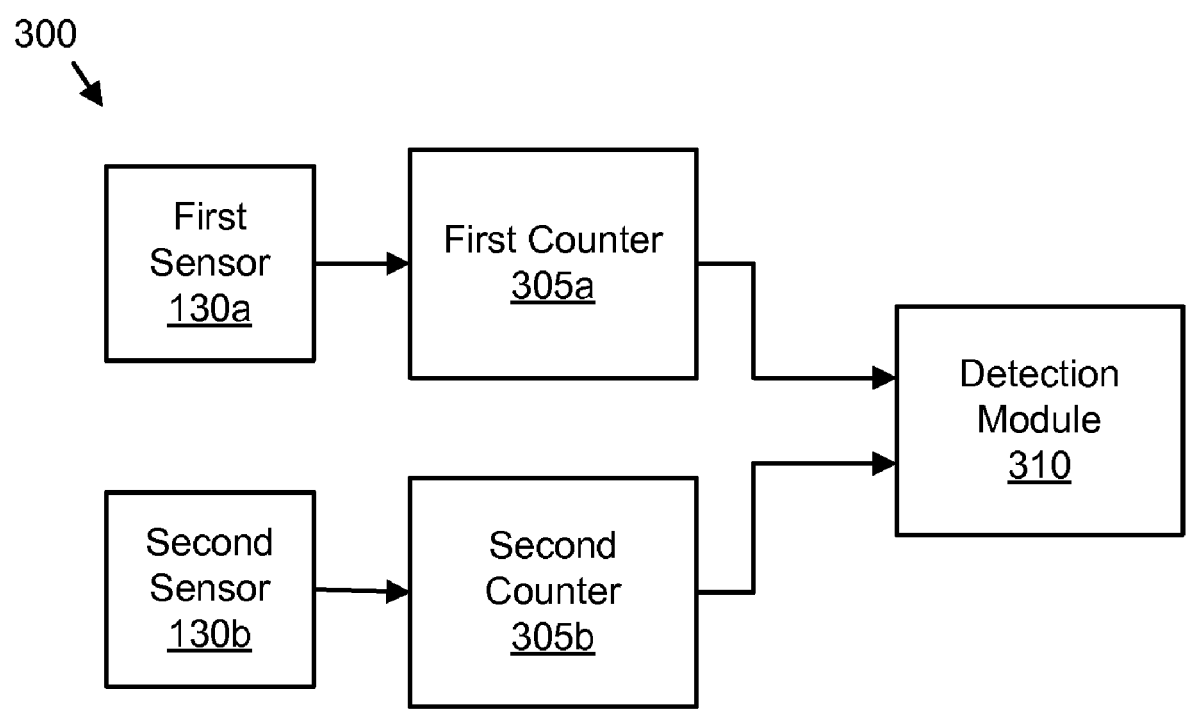
FIG. 3 is a schematic block diagram illustrating one embodiment of an apparatus to detect tape sticking of the present invention.

FIG. 3 is a schematic block diagram illustrating one embodiment of an apparatus 300 to detect tape sticking of the present invention. The apparatus 300 may be embodied in the tape drive 100 of FIG. 1. The description of the apparatus 300 refers to elements of FIGS. 1-2, like numbers referring to like elements. The apparatus 300 includes a first sensor 130a, a second sensor 130b, a first counter 305a, a second counter 305b, and a detection module 310.

The first counter 305a is configured to increment a first count and reset a second count in response to a sensor pulse from a first sensor 130a of a first tape servo 140a. The second counter 305b is configured to increment the second count and reset the first count in response to a sensor pulse from a second sensor 130b of a second tape servo 140b. The sensors 130a-b may be configured as tachometers, cam sensors, or the like.

The sensor pulses may comprise a plurality of waveforms, signals, pulses, or the like. For example, the first sensor 130a may measure a plurality of substantially equal angular displacements for one revolution of the first reel 110a. The first sensor 130a may further generate a sensor pulse in the form of triangular waveform for each measured angular displacement of the first reel 110a over a plurality of time intervals. Similarly, the second sensor 130b may measure a plurality of substantially equal angular displacements for one revolution of the second reel 110b.

The second sensor 130b may further generate a sensor pulse in the form of another triangular waveform for each measured angular displacement of the second reel 110b over a plurality of time intervals. In a particular example, the first sensor 130a and the second sensor 130b may generate four (4) triangle waveforms in response to the first and second sensor pulse for substantially equal four (4) angular displacements of one point five seven one four radians (1.5714 rads) of the first reel 110a and the second reel 110b.

The time intervals for substantially equal angular displacements of the first reel 110a and the second reel 110b may or may not be equal. For example, if the maximum radius ratio of the first reel 110a and the second reel 110b is two (2), the second reel 110b may rotate two times faster than the first reel 110a. Thus the time interval for angular displacements of one point five seven one four radians (1.5714 rads) of the second reel 110b may be half (½) of the time interval for the same angular displacements of the first reel 110a.

Each counter 305a-b may be configured as an electronic device that may increment, decrement, and/or reset number of counts in response to the sensor pulses from the first sensor 130a and the second sensor 130b. For example, the first counter 305a may increment the first count from two (2) to three (3) and reset the second count to zero (0) in response to the first sensor pulse from the first sensor 130a. Concurrently, the second counter 305b may increment second count from one (1) to two (2) and reset the first count to zero (0) in response to the second sensor pulse from the second sensor 130b.

The counters 305a-b may also store either incremented, decremented, or reset counts. An up counter may increment and a down counter may decrement the number of counts. The counters 305a-b may be selected from an asynchronous (ripple) counter, a synchronous counter, a Johnson counter, a decade counter, an up-down counter, a ring counter, a frequency counter, or the like. The asynchronous (ripple) counter, synchronous counter, Johnson counter, decade counter, up-down counter, ring counter, and the frequency counter may be like known to those skilled in the art. In a particular example, the counters 305a-b of the apparatus 300 may be configured as frequency counters.

The maximum radius ratio value may be in the range of two (2) to five (5). In a particular embodiment, the maximum radius ratio value is two (2). For example, the maximum radius ratio value may be of the value of two (2) calculated as the ratio of the radiuses defined by the outer surface 215a and the outer surface 210b of the first reel 110a and the second reel 110b respectively.

The rotational limit may be in the range of zero point one (0.1) to zero point five (0.5) revolutions. The rotational limit may be defined by a maximum desired angular displacement for the tape 105. In a particular embodiment, the rotational limit is zero point two five (0.25) revolutions.

The detection module 310 may be a computer program product comprising a computer useable medium having a computer readable program stored on a tangible storage device. For example, the detection module 310 may be stored in the control module 135. The detection module 310 detects either the first count or the second count exceeding an error threshold. Alternatively, the detection module 310 may be configured as a semiconductor comparator.

The error threshold may be calculated as an integer value of a product of pulses per revolution from a sensor 130a, 130b, a rotational limit, and a maximum radius ratio value, wherein the maximum radius ratio value is a ratio to one of reel radiuses. For example, the detection module 310 may detect either the first count with value of seven (7) exceeding an error threshold of the value of six (6). In one embodiment, the error threshold is stored in a register of the control module 135. Alternatively, the error threshold may be stored in a register in communication with the comparator.

In an embodiment, either the first count or the second count exceeding the error threshold indicates a stuck tape 105. For example, either the first count with the value of seven (7) or more or the second count with the value of seven (7) or more exceeding an error threshold of the value of six (6) may indicate the stuck tape 105. Alternatively, either the first count or the second count exceeding the error threshold may indicate a broken tape 105.

In an embodiment, the detection module 310 further communicates an error message. For example, the detection module 310 may communicate the error message that the tape 105 is stuck. Alternatively, the detection module 310 may communicate the error message that the tape 105 is broken.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
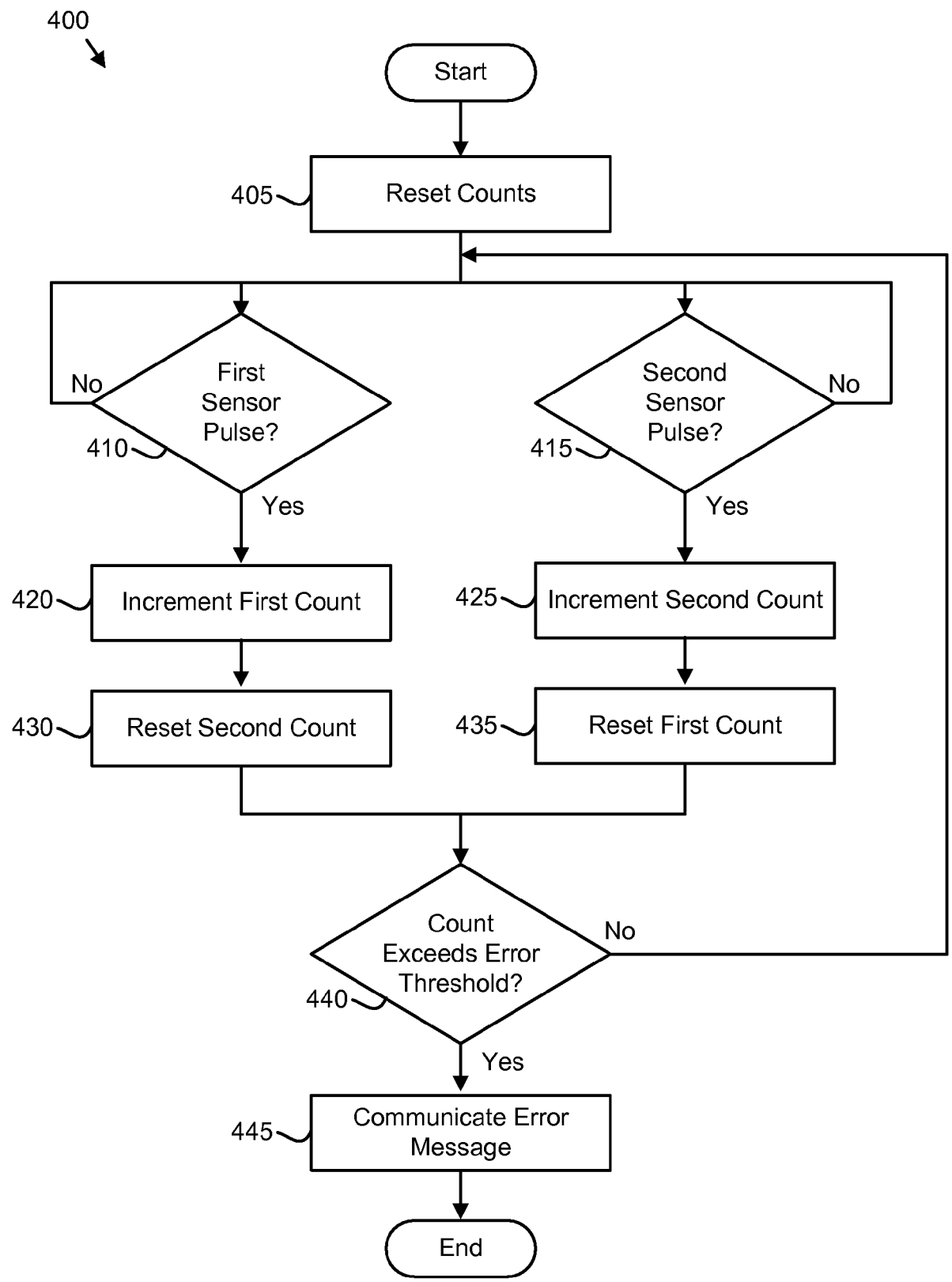
FIG. 4 is a schematic flow chart diagram illustrating one embodiment of a method for detecting tape sticking of the present invention.

FIG. 4 is a schematic flow chart diagram illustrating one embodiment of a method 400 for detecting tape sticking of the present invention. The method 400 substantially includes the steps to carry out the functions presented above with respect to the operation of the tape drive 100 and apparatus 300 of FIGS. 1 and 3 respectively. The description of method 400 refers to elements of FIGS. 1-3, like numbers referring to the like elements. In one embodiment, the method is implemented with a computer program product comprising a computer readable medium having a computer readable program. The control module 135 of the tape drive 100 may execute and store the computer readable program.

The method 400 starts and in an embodiment, the control module 135 may reset 405 a first count and a second count. For example, at a time when the tape drive 100 starts to read the data from the tape 105 or write the data to the tape 105, the control module 135 may automatically initiate one or more electronic signals that may reset 405 the first count and the second count to zero (0) as is well known to those skilled in the art. In one embodiment, the first counter 305a comprises the first count and the second counter 305b comprises the second count.

The first counter 305a may detect 410 the sensor pulse. For example, the first counter 305a may automatically detect 410 that there is first sensor pulse from the first Hall effect sensor 130a or not. If the first counter 305a does not detect 410 the first sensor pulse from the first Hall effect sensor 130a, the first counter 305a may not take action until the first counter 305a detects 410 the first sensor pulse from the first Hall effect sensor 130a.

Concurrent second counter 305b may detect 415 a sensor pulse. For example, the second counter 305b may automatically detect 415 that there is second sensor pulse from the second Hall effect sensor 130b or not. If the second counter 305b does not detect 415 the second sensor pulse from the second Hall effect sensor 130b, the second counter 305b may not take action until the second counter 305b detects 415 the second sensor pulse from the second Hall effect sensor 130b.

In response to the first sensor pulse from the first sensor 130a of the first tape servo 140a, the first counter 305a increments 420 the first count. For example, the first Hall effect sensor 130*a* of the first tape servo 140*a* may generate the sensor pulse comprising twenty-four (24) triangular waveforms for one (1) revolution of the first reel 110*a*. There may be one (1) triangular waveform for each measured angular displacement of zero point two six one nine radian (0.2619 rad) of the first reel 110*a* over substantially equal twenty-four (24) time intervals. In response to a sensor pulse comprising one (1) triangular waveform, the first counter 305*a* may increment 420 the first count from zero (0) to one (1).

Further, in response to the first sensor pulse from the first sensor 130*a* of the first tape servo 140*a*, the first counter 305*a* resets 430 the second count. For example, each time the first counter 305*a* increments 420 the first count, the first counter 305*a* may reset 430 the second count to zero (0).

In response to the second sensor pulse from the second sensor 130*b* of the second tape servo 140*b*, the second counter 305*b* increments 425 the second count. For example, in response to the second sensor pulse comprising one (1) triangular waveform, the second counter 305*b* may increment 425 the second count from zero (0) to one (1).

Further, in response to the sensor pulse from the second sensor 130*b* of the second tape servo 140*b*, the second counter 305*b* resets 435 the first count. For example, each time the second counter 305*b* increments 425 the second count, the second counter 305*b* may reset 435 the first count to zero (0).

The detection module 310 detects 440 either the first count or the second count exceeding the error threshold. In an embodiment, the error threshold is calculated as the integer value of the product of pulses per revolution from the sensor, the rotational limit, and the maximum radius ratio value, wherein the maximum radius ratio value is a ratio to one of reel radiuses. The maximum radius ratio value is in the range of two (2) to five (5). In a particular embodiment, the maximum radius ratio value is two (2). The rotational limit may be in the range of zero point one (0.1) to zero point five (0.5) revolutions. In a particular embodiment, the rotational limit is zero point two five (0.25) revolutions.

In first example, if there are twenty-four (24) pulses per revolution from the first sensor 130*a* for the first reel 110*a*, the rotational limit is zero point two (0.2) revolutions, and the maximum radius ratio value is one point five (1.5), the error threshold may be calculated of the value of seven point two (7.2) and rounded to the integer value of seven (7). The detection module 310 may detect 440 that the first count of the value of twenty-four (24) exceeds the error threshold of the integer value of seven (7).

In second example, if there are twelve (12) pulses per revolution from the second sensor 130*b* for the second reel 110*b*, the rotational limit is zero point four five (0.45) revolutions, and the maximum radius ratio value is one point five (1.9), the error threshold may be calculated of the value of ten point two six (10.26) and rounded to the integer value of ten (10). The detection module 310 may detect 440 that the second count of the value of twelve (12) exceeds the error threshold of the integer value of ten (10).

In third example, if there are twelve (12) pulses per revolution from the second sensor 130*b* for the second reel 110*b*, the rotational limit is zero point four five (0.45) revolutions, and the maximum radius ratio value is two point zero three seven (2.037), the error threshold may be calculated as the integer value of the value of eleven (11). The detection module 310 may detect 440 that the second count of the value of twelve (12) exceeds the error threshold calculated as the integer value of eleven (11). If the detection module 310 does not detect 440 either the first count or the second count exceeding the error threshold, the method 400 loops to step 410 and step 415.

If the detection module 310 detects 440 either the first count or the second count exceeding the error threshold, the detection module 310 may further communicate 445 an error message to the control module 135. Continuing with the second example, wherein the second count of the value of twelve (12) exceeds the error threshold of the value of ten (10), the detection module 310 may communicate 445 the error message configured as an asserted electrical signal to the control module 135.

The count exceeding the error threshold may indicate a broken tape 105. Alternatively, the count exceeding the error threshold may indicate a stuck tape 105. For example, the second count of the value of twelve (12) exceeding the error threshold of the value of ten (10) may indicate the broken or stuck tape 105. Thus the method 400 would detect tape sticking and breakage using counters 305*a-b*. In addition the method 400 may automatically halt functioning of the tape drive 100 by issuing a stop signal.

Figure 5:
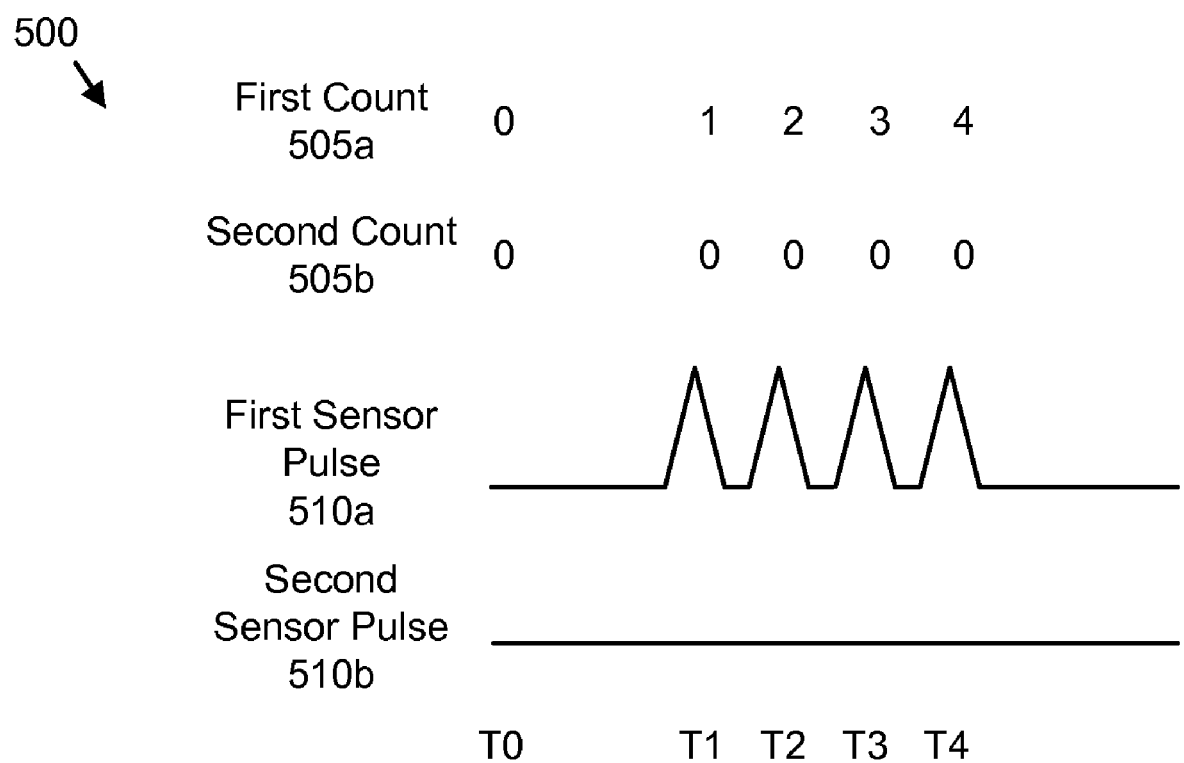
FIG. 5 is a schematic diagram illustrating one embodiment of counts and sensor pulses of the present invention.

FIG. 5 is a schematic diagram illustrating one embodiment of counts and sensor pulses 500 of the present invention. The description of the counts and sensor pulses 500 refers to elements of FIGS. 1-4, like numbers referring to like elements. The illustrated counts and sensor pulses 500 include a first count 505*a*, a second count 505*b*, a first sensor pulse 510*a*, and a second sensor pulse 510*b*. The first sensor pulse 510*a* is a sensor pulse of the first sensor 130*a* and the second sensor pulse 510*b* is a sensor pulse of the second sensor 130*b*.

In the shown embodiment, the counts and sensor pulses 500 are illustrated at plurality of times T0, T1, T2, T3, and T4. The time T0 may indicate a time at which the sensors 130*a-b* start to measure the angular displacements of the reels 110*a-b*. T0 to T1, T1 to T2, T2 to T3, and T3 to T4 may indicate first, second, third, and fourth time intervals during movement of the tape 105. Also, in the shown embodiment, the time intervals T0 to T1, T1 to T2, T2 to T3, and T3 to T4 are not equal.

In the shown embodiment, at time T0, the first count 505*a* and the second count 505*b* are reset to zero (0). For example, the control module 135 may reset 405 the first count 505*a* and the second count 505*b* to zero (0) at start.

The first sensor pulse 510*a* is shown comprising four (4) triangular waveforms. At time T1, there is a first triangular waveform. The first triangular waveform may indicate first angular displacement of zero point one nine six radians (0.196 rads) from the start of movement of the first reel 110*a*. Similarly, at times T2, T3, and T4, there are second, third, and fourth triangular waveforms respectively. The second, third, and fourth triangular waveforms may indicate second, third, and fourth angular displacements of zero point one nine six radians (0.196 rads) of the first reel 110*a* respectively.

The first count 505*a* is shown incremented from zero (0) to one (1), from one (1) to two (2), from two (2) to three (3), and from three (3) to four (4) in response to the corresponding first, second, third, and fourth triangular waveforms of the first sensor pulse 510*a*. Additionally, the second count 505*b* is shown reset to zero (0) each time the first count 505*a* is shown incremented.

The second sensor pulse 510*b* is shown comprising a straight line with no triangular waveform. The second sensor pulse 510*b* comprising no waveform may indicate that the second sensor 130*b* does not measure angular displacement of the second reel 110*b*. This may further indicate that the second reel 110*b* is not moving and the tape 105 is stuck.

Additionally, in the shown embodiment, the first sensor pulse 510*a* and the second sensor pulse 510*b* do not comprise any waveform beyond time T4. This may indicate that the tape drive 100 automatically stopped functioning.

The present invention robustly detects tape stick and tape breakage using counters 305a-b detecting sensor pulses 510a-b. The error threshold may be set to prevent damage to the tape 105 and the tape drive 100.

Figure 6:
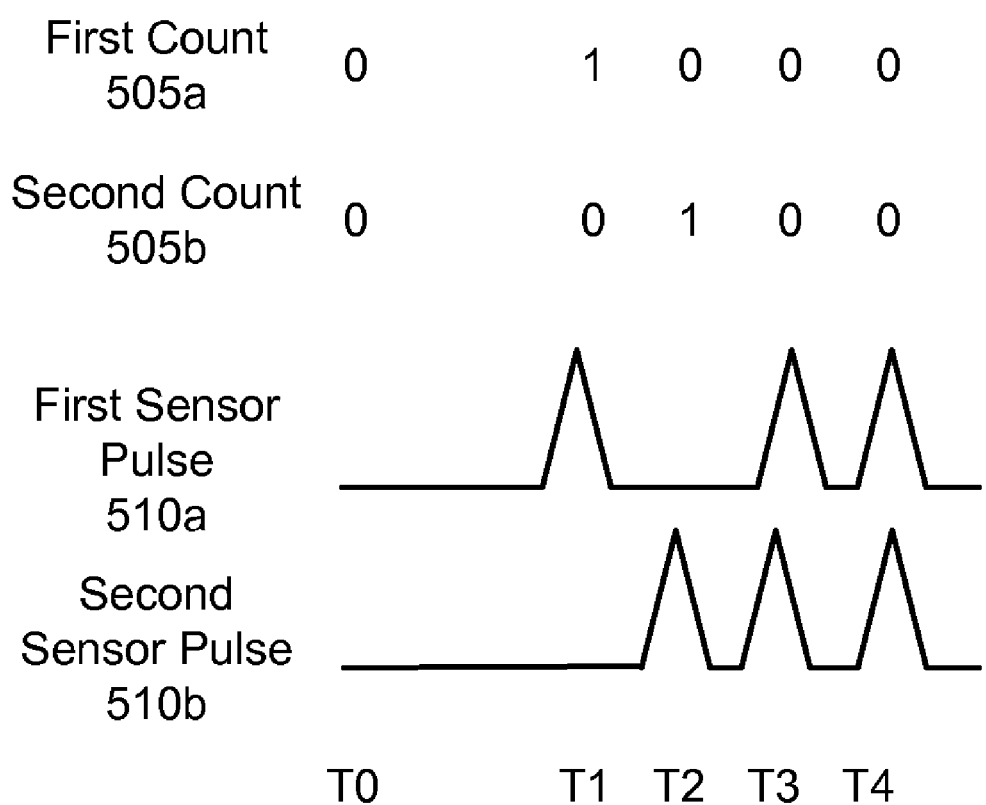
FIG. 6 is a schematic diagram illustrating one alternate embodiment of counts and sensor pulses of the present invention.

FIG. 6 is a schematic diagram illustrating one alternate embodiment of counts and sensor pulses 600 of the present invention. The description of the counts and sensor pulses 600 refers to elements of FIGS. 1-5, like numbers referring to like elements. The counts and sensor pulses 600 include the first count 505a, the second count 505b, the first sensor pulse 510a, and the sensor pulse 510b of FIG. 5. Whereas FIG. 5 is illustrated detecting the tape stick, FIG. 6 illustrates the present invention wherein there is no tape stick or breakage.

In the shown embodiment, the counts and sensor pulses 600 are illustrated at times T0, T1, T2, T3, and T4. The time T0 may indicate a time at which the sensors 130a-b start to measure angular displacements of reels 110a-b.

In the shown embodiment, at time T0 the first count 505a and the second count 505b are reset to zero (0). For example, the control module 135 may reset 405 the first count 505a and the second count 505b to zero (0) at start.

The first sensor pulse 510a and the second sensor pulse 510b are shown comprising three (3) triangular waveforms. At time T1, the first sensor pulse 510a is shown comprising the first (1st) triangular waveform. The first count 505a is shown incremented from zero (0) to one (1) in response to the first triangular waveform of the first sensor pulse 510a. Additionally, the second count 505b is shown reset to zero (0) in response to the first triangular waveform of the first sensor pulse 510a.

In the shown embodiment, at time T2, the first sensor pulse 510a does not comprise any triangular waveform. Concurrent second sensor pulse 510b comprises first triangular waveform. The second count 505b is shown incremented from zero (0) to one (1) in response to the first triangular waveform of the second sensor pulse 510b. Additionally, the first count 505a is shown reset to zero (0) in response to the first triangular waveform of the second sensor pulse 510b.

At time T3, the first sensor pulse 510a does not comprise any triangular waveform. Concurrent second sensor pulse 510b comprises the second triangular waveform. The second count 505b may be incremented from one (1) to two (2) (not shown) in response to the second triangular waveform of the second sensor pulse 510b. Additionally, the first count 505a may be reset to zero (0) (not shown) in response to the second triangular waveform of the second sensor pulse 510b.

At slightly more time than T3, the first sensor pulse 510a is shown comprising the second triangular waveform. Additionally, the first and second counts 505a-b are shown reset to zero (0) in response to the second triangular waveform of the first and second sensor pulses 510a-b.

At time T4, the first sensor pulse 510a and the second sensor pulse 510b are shown comprising third triangular waveforms. In response to the third triangular waveforms of the first sensor pulse 510a and the second sensor pulse 510b, the first counter 305a may have incremented 420 the first count 505a from one (1) to two (2) (not shown) and the second counter 305b may have incremented 425 the second count 505b from zero (0) to one (1) (not shown). Additionally, the first count 505a and the second count 505b are shown reset to zero (0) in response to the third triangular waveforms of the first sensor pulse 510a and the second sensor pulse 510b.

The present invention detects tape sticking and breakage using counters 305. In addition, the present invention may protect against tape and head damage through rapid detection of tape sticking and breakage with minimal hardware. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to detect tape sticking, the apparatus comprising:
    a first counter incrementing a first count and resetting a second count in response to a sensor pulse from a first sensor of a first tape servo;
    a second counter incrementing the second count and resetting the first count in response to a sensor pulse from a second sensor of a second tape servo; and
    a detection module detecting one of the first count and the second count exceeding an error threshold.

2. The apparatus of claim 1, wherein the error threshold is calculated as an integer value of a product of pulses per revolution from the sensor, a rotational limit, and a maximum radius ratio value, wherein the maximum radius ratio value is a ratio to one of reel radiuses.

3. The apparatus of claim 2, wherein the rotational limit is in the range of 0.1 to 0.5 revolutions.

4. The apparatus of claim 3, wherein the rotational limit is 0.25 revolutions.

5. The apparatus of claim 2, wherein the maximum radius ratio value is in the range of two to five.

6. The apparatus of claim 5, wherein the maximum radius ratio value is two.

7. The apparatus of claim 1, wherein one of the first count and the second count exceeding the error threshold indicates a stuck tape.

8. The apparatus of claim 1, wherein one of the first count and the second count exceeding the error threshold indicates a broken tape.

9. The apparatus of claim 1, the detection module further communicating an error message.

10. The apparatus of claim 1, wherein the first and the second sensors are Hall effect sensors.

11. A method to detect stuck tape, the method comprising:
    incrementing a first count and resetting a second count in response to a sensor pulse from a first sensor of a first tape servo;
    incrementing the second count and resetting the first count in response to a sensor pulse from a second sensor of a second tape servo; and
    detecting one of the first count and the second count exceeding an error threshold.

12. The method of claim 11, wherein the error threshold is calculated as an integer value of a product of pulses per revolution from the sensor, a rotational limit, and a maximum radius ratio value, wherein the maximum radius ratio value is a ratio to one of reel radiuses.

13. The method of claim 12, wherein the rotational limit is in the range of 0.1 to 0.5 revolutions.

14. The method of claim 12, wherein the maximum radius ratio value is in the range of two to five.

15. The method of claim 11, the method further comprising communicating an error message.

16. A system to detect tape sticking, the system comprising:
    a first reel spooling a tape;
    a first tape servo applying torque to the first reel;
    a first Hall effect sensor measuring angular displacement of the first reel;

a second reel spooling the tape;

a second tape servo applying torque to the second reel;

a second Hall effect sensor measuring angular displacement of the second reel;

a first counter incrementing a first count and resetting a second count in response to a sensor pulse from the first Hall effect sensor;

a second counter incrementing the second count and resetting the first count in response to a sensor pulse from the second Hall effect sensor; and a detection module detecting one of the first count and the second count exceeding an error threshold.

17. The system of claim 16, wherein the error threshold is calculated as an integer value of a product of pulses per revolution from the sensor, a rotational limit, and a maximum radius ratio value, where the maximum radius ratio value is a ratio to one of reel radiuses.

18. The system of claim 16, wherein the rotational limit is 0.25 revolutions.

19. The system of claim 16, wherein the maximum radius ratio value is two.

20. A computer program product to detect tape sticking comprising a computer useable medium storing a computer readable program stored on a tangible storage device, wherein the computer readable program when executed on a computer causes the computer to:

increment a first count and reset a second count in response to a sensor pulse from a first sensor of a first tape servo;

increment the second count and reset the first count in response to a sensor pulse from a second sensor of a second tape servo; and detect one of the first count and the second count exceeding an error threshold.

* * * * *